United States Patent [19]

Leistensnider et al.

[11] Patent Number: 5,055,752

[45] Date of Patent: Oct. 8, 1991

[54] METHOD FOR MACHINING AIRFOILS

[75] Inventors: George W. Leistensnider, South Windsor; Alfred J. Albetski, Enfield; Russell S. Welz, Tolland; Carl E. Petersen, Manchester, all of Conn.

[73] Assignee: United Technologies Corporation, Hartford, Conn.

[21] Appl. No.: 513,320

[22] Filed: Apr. 20, 1990

[51] Int. Cl.$^5$ .............. G05B 19/42; G01B 5/20; B21D 5/14
[52] U.S. Cl. .................... 318/570; 318/572; 318/578; 364/560; 72/9; 72/177
[58] Field of Search ............... 318/560–632; 29/889, 889.23, 889.3, 889.6, 889.7, 889.71, 889.72, DIG. 16, 423, 426.5, 426.6, 428, 463, 469; 416/223 R, 223 A, 232, 233, 225, 238, 239, 242, DIG. 2, DIG. 3; 204/224 M, 225, 297 R, 289, 129.1, 129.65, 278, 129.7, 212; 72/379, 220, 354.2, 358, 2–10, 359, 358

[56] References Cited

U.S. PATENT DOCUMENTS

| | | | |
|---|---|---|---|
| 3,627,997 | 12/1971 | Samuels | 364/560 |
| 4,382,215 | 5/1983 | Barlow et al. | 318/568 |
| 4,553,418 | 11/1985 | Stoehr et al. | 72/177 X |
| 4,755,952 | 7/1988 | Johns | 364/560 X |
| 4,761,979 | 8/1988 | Kawaguchi et al. | 72/9 |
| 4,770,017 | 9/1988 | Yamashita et al. | 72/177 X |
| 4,796,449 | 1/1989 | Berne | 72/9 |
| 4,811,253 | 3/1989 | Johns | 364/560 |
| 4,857,412 | 8/1989 | Fleury | 29/423 X |
| 4,878,368 | 11/1989 | Toutant et al. | 72/9 |
| 4,908,951 | 3/1990 | Gurny | 364/560 X |

Primary Examiner—Paul Ip

[57] ABSTRACT

The elongated edge of a workpiece is machined to preselected dimensions and tolerances using a numerically controlled machining system by probing the surface of the workpiece along the length of the edge to be machined to determine edge dimensions and/or its actual position and orientation at such preselected locations relative to a cutting tool holder and to the workpiece fixture, and generating and storing data indicative thereof, and machining the edge of the workpiece under the direction of a machine program which accesses that data and other known preselected part design data which has been stored and causes a cutting tool to follow the actual edge of the part, cutting the edge to preselected dimensions as the cutting tool travels relative thereto, the workpiece and the cutting tool being reoriented relative to each other as the tool being reoriented relative to each other as the tool moves along the edge to maintain the tool in appropriate angular and positional relation to the workpiece over the length of the edge.

2 Claims, 7 Drawing Sheets

METHOD FOR MACHINING AIRFOILS

DESCRIPTION

1. Technical Field

This invention relates to the machining of airfoils.

2. Background Art

It is desirable to reduce the cost of manufacturing airfoils for gas turbine engines by automating the manufacturing process to the extent possible. If the shape of the leading and/or trailing edge of the airfoil (i.e., its radius of curvature or other shape when the edge is viewed in cross section perpendicular to the airfoil stacking line length) is important to efficient performance of the airfoil, such edges need to be accurately formed. As is well-known, airfoils are designed with a variety of shapes. For example, some are fairly flat such that their trailing and leading edges are nominally straight. Or the airfoil may have a degree of twist about its stacking line such that the trailing and/or leading edge follows a spiral-like path which may have a small or large degree of curvature, depending upon the degree of twist. The airfoil may be designed with an edge having variable thickness or variable radius of curvature along its length.

Often it is desirable or necessary to form the airfoil edge to its final shape in a separate operation after the body of the airfoil has been at least partially formed or machined. For example, hollow airfoils are sometimes formed by bonding pressure and suction side metal skins to opposite sides of a supporting rib structure. Bonding may be accomplished by electron beam welding, resistance welding, diffusion bonding or the like. The airfoil shape may be formed simultaneously with the bonding operation or thereafter by coining, for example. In one manufacturing technique, a bead of weld material is applied over the length of an unfinished edge to bond the halves together; and that weld material is partially machined away to form the final desired shape of the edge.

If an unfinished airfoil edge were known to be accurately located, oriented and dimensioned in accordance with its nominal engineering design, then the airfoil edge could be readily machined by current numerical control machining methods. However, if the location, orientation, thickness or other features of the edge vary significantly from part to part (although still within acceptable tolerances), finishing the edges by prior art numerical control machining methods has not been possible. In fact, such edge's have sometimes had to be finished by hand, which is very expensive and does not produce consistently reliable results. It is desirable to be able to automatically and relatively inexpensively and accurately finish machine the edges of such airfoils and features of other parts with similar characteristics.

In Barlow et al. U.S. Pat. No. 4,382,215 a programmable computer numerical control machine operates under the direction of a machining program to automatically machine a workpiece to precise selectively determined dimensions. Two probes are used to determine the relative position of the workpiece holder and the tool holder, as well as one probe being used to calibrate the position of the other probe and to calibrate the position of the tool cutting edge. The machining program includes selectively determined finished dimensions of the part being made and to which it is desired to machine the workpiece. The process requires a minimum of two cuts to arrive at the finished dimension. After the first cut one of the probes is brought into contact with the cut surface, compares its dimension to the previously input desired dimension, calculates the deviation, and causes the cutter motion to be adjusted to the correct amount so that the final dimension will be achieved on the subsequent cut. This method cannot be used to machine, sequentially, a plurality of the same part when the feature to be machined is in a location or is oriented differently from part-to-part when the part is fixtured for machining.

SUMMARY OF THE INVENTION

The elongated edge of a workpiece is machined to preselected dimensions and tolerances using a numerically controlled machining system by probing the surface of the workpiece along the length of the edge to be machined to determine edge dimensions and/or its actual position and orientation at such preselected locations relative to a cutting tool holder and to the workpiece fixture, and generating and storing data indicative thereof, and machining the edge of the workpiece under the direction of a machine program which accesses that data and other known preselected part design data which has been stored and causes a cutting tool to follow the actual edge of the part, cutting the edge to preselected dimensions as the cutting tool travels relative thereto, the workpiece and the cutting tool being reoriented relative to each other as the tool moves along the edge to maintain the tool in appropriate angular and positional relation to the workpiece over the length of the edge.

The method of the invention is particularly suited to the machining of many nominally identical parts, but wherein the permitted tolerances from prior manufacturing steps results in significant part-to-part variations in the location and orientation (relative to known reference points on the part) of the portion of the part from which the material is to be removed. When such parts are placed in a fixture in an automated machining system, the portion to be machined is located and oriented differently from part to part relative to fixture reference points used to locate the part in the fixture.

Thus an airfoil may have its leading edge accurately machined and positioned relative to the airfoil stacking line. However, when that leading edge and stacking line are accurately positioned in the fixture of an automated machining system, the unmachined trailing edge will be located, oriented or shaped differently for each part simply due to manufacturing tolerances.

The present invention uses a single machining program written for a particular part which is to be produced in quantity. Using an airfoil as an example, each airfoil workpiece is fixtured into the machining apparatus and the feature to be cut, such as the unfinished trailing edge, is probed to generate data is stored in a memory which the machine program can access to determine exactly where the feature is located and how it is oriented relative to a cutting tool holder and the fixture Nominal engineering dimensions (e.g., from the engineering drawing) to which it is desired to cut are also input into the memory or is part of the machine program. The machine program then controls the machining apparatus to move the part and cutting tool relative to each other in a manner resulting in the correct cut.

More particularly, in a multi-axis closed loop numerically controlled machining system having a workpiece fixture and cutting tool spindle controllably movable relative to each other, the method of machining a leading or trailing edge of an airfoil workpiece disposed within the fixture includes the steps of placing a probe within the cutting tool spindle and probing reference surfaces on the fixture to generate machine offset machine offset data indicative of the relative positions of the spindle, the fixture and the probe; storing the offset data; and then probing points on the surface of the airfoil workpiece along and adjacent to the length of the edge to be machined to generate airfoil data indicative of the actual position and characteristics of the edge; storing such airfoil data; removing the probe from the spindle and replacing it with the cutting tool; and machining the length of the edge of the airfoil workpiece under the direction of a machine program which accesses the stored data and causes the cutting tool to follow along the actual airfoil workpiece edge, cutting the edge as it travels relative thereto, and causing the airfoil and the cutter to be continuously reoriented relative to each other as the cutter moves along the edge to maintain the cutting tool spindle axis and the cutting tool, in appropriate angular and positional relation to the workpiece. By this technique part to part variations in the actual position and orientation of the edges of airfoil workpieces prior to machining are accommodated, and the edges are automatically and efficiently machined.

Thus, a single machine program is used to machine a feature of a plurality of parts which are nominally the same, per engineering design; but the location and orientation of the feature to be machined may vary significantly from part to part, although within engineering design tolerances. The machine program includes selected nominal part dimensions. The probing generates part specific data (i.e. actual hardware data) which the machine program can access. The nominal and specific data are used in a machine program to calculate the correct position and orientation of the cutter during machining of the specific part. Only part specific data is changed as each new part is processed.

The forgoing and other features and advantages of the present invention will become more apparent from the following description and accompanying drawings.

BRIEF DESCRIPTION OF THE DRAWINGS

FIG. 5 is an enlarged view of a portion of FIG. 3.

BEST MODE FOR CARRYING OUT THE INVENTION

Figure 1:
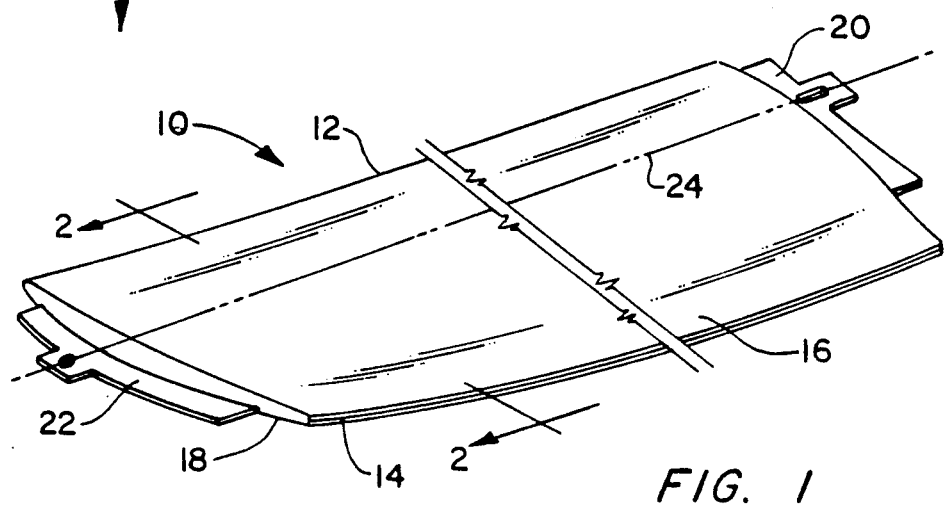
FIG. 1 is a perspective view of a compressor airfoil having an unfinished trailing edge which is to be machined by the method of the present invention.

FIG. 1 shows a compressor airfoil 10 at an intermediate stage in the manufacturing process. The airfoil 10 comprises a finished leading edge 12, an unfinished trailing edge 14, a pressure surface 16, and a suction surface 18. Integral with each end of the airfoil are tabs 20, 22, respectively. The tabs are manufacturing aids and are not part of the finished airfoil. They are machined off during a later manufacturing step. In this airfoil the trailing edge is nominally of constant thickness.

Figure 2:
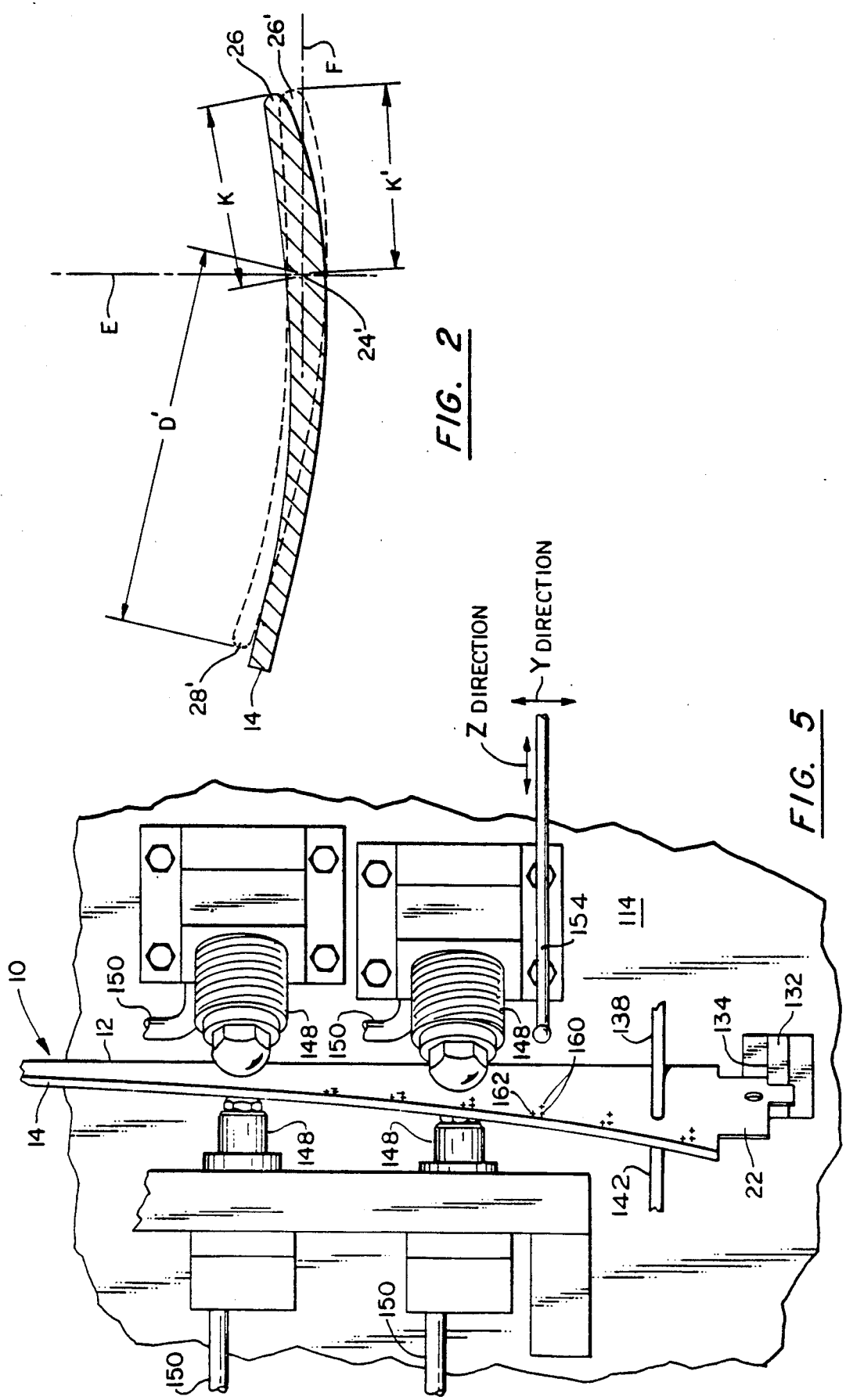
FIG. 2 is a sectional view taken along the line 2—2 of FIG. 1. Superimposed on the section is a phantom outline of the airfoil at that section, per nominal engineering design dimensions.

In FIG. 2 the solid line depicts a typical section taken through the airfoil 10 in a plane perpendicular to the airfoil stacking line 24. The point 24' where the stacking line intersects the section plane is referred to as the stacking point of that airfoil section. The stacking point of a typical airfoil section is the point about which the airfoil section is positioned. The stacking line contains all the stacking points of all the airfoil sections. In this embodiment, the stacking line 24 is a straight line, but it may also be a curved line. In the airfoil section shown in FIG. 2 the stacking point falls within the confines of the airfoil section; however, that is not necessarily true for every section along the length of the airfoil.

The trailing edge 14 of the airfoil 10 is to be machined by the method of the present invention. In FIG. 2 the planes E and F intersect along the stacking line 24 and represent the coordinate system used on the engineering drawing to define the nominal size, shape and position of each airfoil section relative to other airfoil sections. The dotted line in FIG. 2 represents the outline of the airfoil at the section shown, in accordance with the nominal engineering drawing dimensions of the airfoil. The airfoil in this example is designed such that the center points 26' of the leading edge at every airfoil section fall within a common plane which is parallel to the stacking line 24. However, the leading edge center points 26' do not form a straight line in that plane. K' is the distance between the point 26' and the stacking line 24 at each section. In machining the leading edge 12, the distance K was maintained to close tolerance at the appropriate nominal (per engineering design) value K' for each section.

As can be seen in FIG. 2, the unfinished trailing edge 14, like the leading edge 12, is not located accurately with respect to the engineering nominal position. More importantly, the relative position between the trailing edge 14 of the actual partially manufactured airfoil 10 and the nominal engineering design position may vary randomly from section to section, and might fall on one side of the nominal position in one section and on the other side in another section. What has been determined to be important to the performance of this particular airfoil is that the engineering design nominal distance D'

(which can vary from section to section) between the stacking point 24 and the center point 28 of the trailing edge at each airfoil section be maintained to close tolerance; and that a tangent to the mean chordline of each airfoil section at the trailing edge is close to coincident with a radial line of the trailing edge radius. These requirements will become more clear as the method of the present invention is further described hereinafter.

Figure 3:
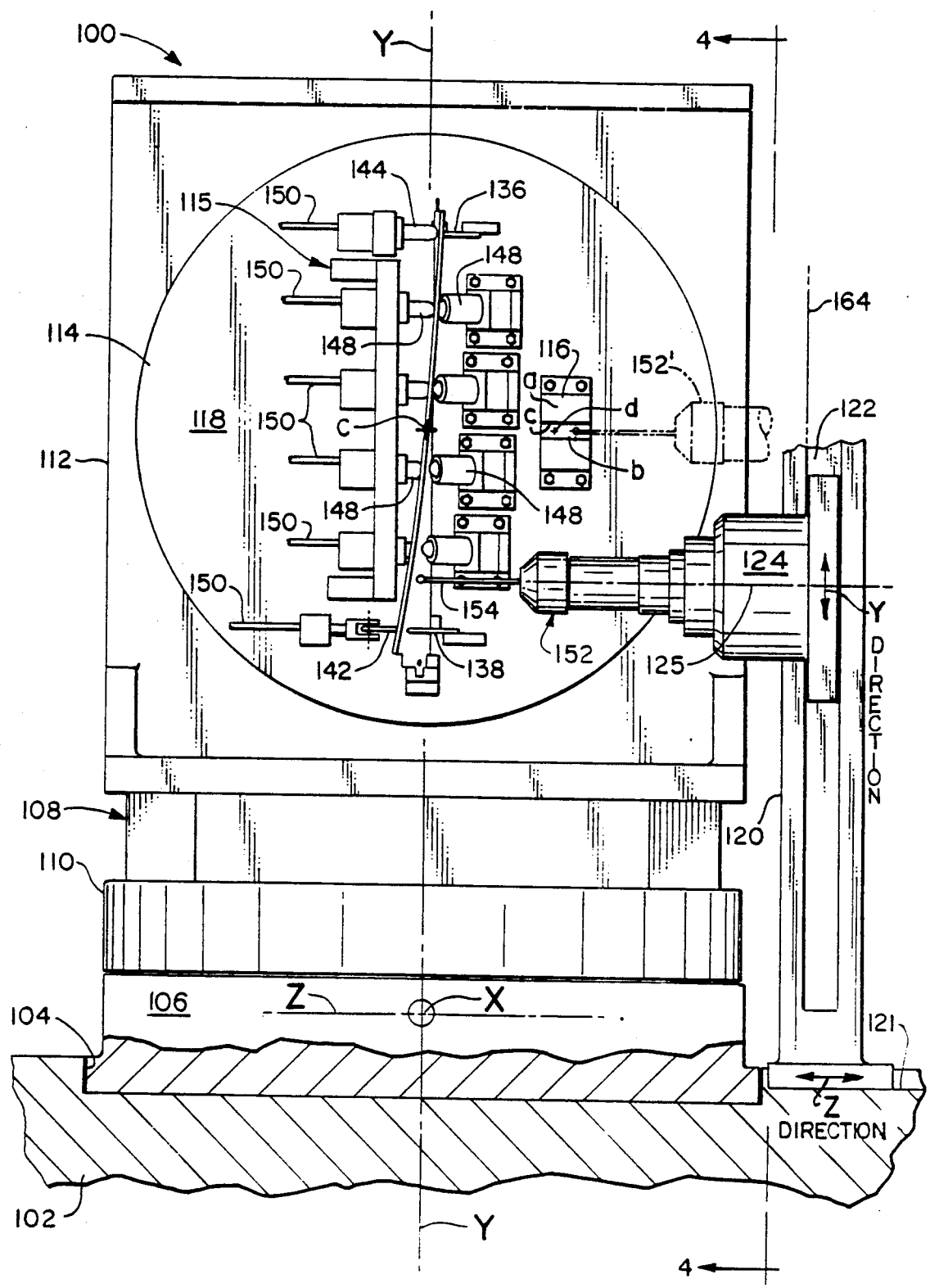
FIG. 3 is a simplified, illustrative view of machining apparatus used in practicing the method of the present invention, with the part to be machined fixtured therein and the probe in operative position.
Figure 4:
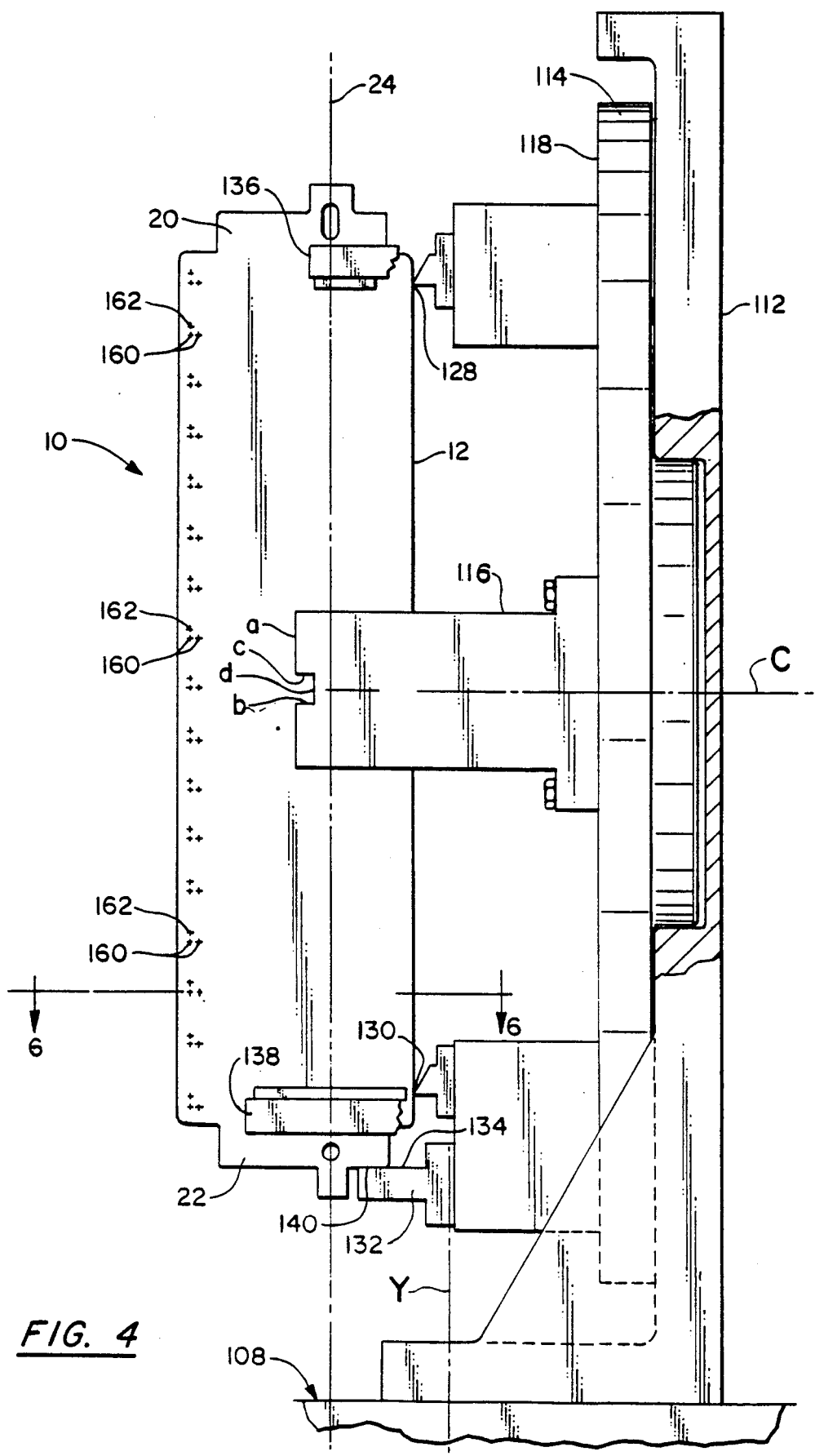
FIG. 4 is a view taken in the direction 4—4 of FIG. 3, with certain elements of the apparatus not shown or broken away to more clearly show other elements located behind them in this view.

Reference is now made to FIGS. 3 and 4 which show a programmable numerically controlled machining system generally represented by the reference numeral 100. The particular machining system used in this exemplary embodiment is a Model HN63B numerically controlled machining center manufactured by Niigata Engineering Company, Ltd. of Tokyo, Japan. In the drawing the machining system 100 is shown and described illustratively, in simplified fashion, and only with sufficient detail to explain its operation in conjunction with the method of the present invention. It will become clear that the method of the present invention does not require the use of a specific type or model of numerically controlled machining system. The one described herein happens to be a five axis system, but three and four axis systems may be suitable depending upon the requirements of the part being machined.

With reference to FIG. 3, the machining system 100 comprises a stationary bed 102, a fixture support bed 106, a workpiece fixture 108, and cutting tool support column 120. The stationary bed 102 has a channel 104 therein. Disposed within the channel 104 is the fixture bed 106 which slides within the channel 104 along an axis perpendicular to the plane of the paper and which is herein referred to as the X axis. Mounted on the slidable fixture bed 106 and rotatable relative thereto about a vertical Y axis parallel to the plane of the paper is the workpiece fixture 108. The fixture 108 comprises a base 110, a support frame 112, a rotatable plate 114, workpiece holding apparatus generally designated by the reference numeral 115, and a gage block 116. The support frame 112 is fixedly secured to the base 110. Rotatably mounted on the frame 112 is the circular plate 114. The plate 114 rotates about an axis herein designated as the C axis which is perpendicular to the Y axis and to the face 118 of the plate 114.

The tool support column 120 slides in a channel 121 in the stationary bed 102 in the direction of an axis herein referred to as the Z axis, which is perpendicular to the X and Y axes. Within the column 120 is a vertically extending spindle track 122. Disposed for movement in the Y direction within the spindle track 122 is a spindle 124. The spindle axis 125 is parallel to the Z axis.

Disposed in the spindle 124 is a probe 152. The probe axis is essentially coincident with the spindle axis 125. The probe includes a stylus 154 extending along the axis 125 and terminating at a spherical tip 156, best shown in FIG. 6. In this example, the probe is a Renishaw Model MP7 touch trigger probe with an optical transition system, made by Renishaw, Inc. of Schaumburg, Ill.

Figure 6:
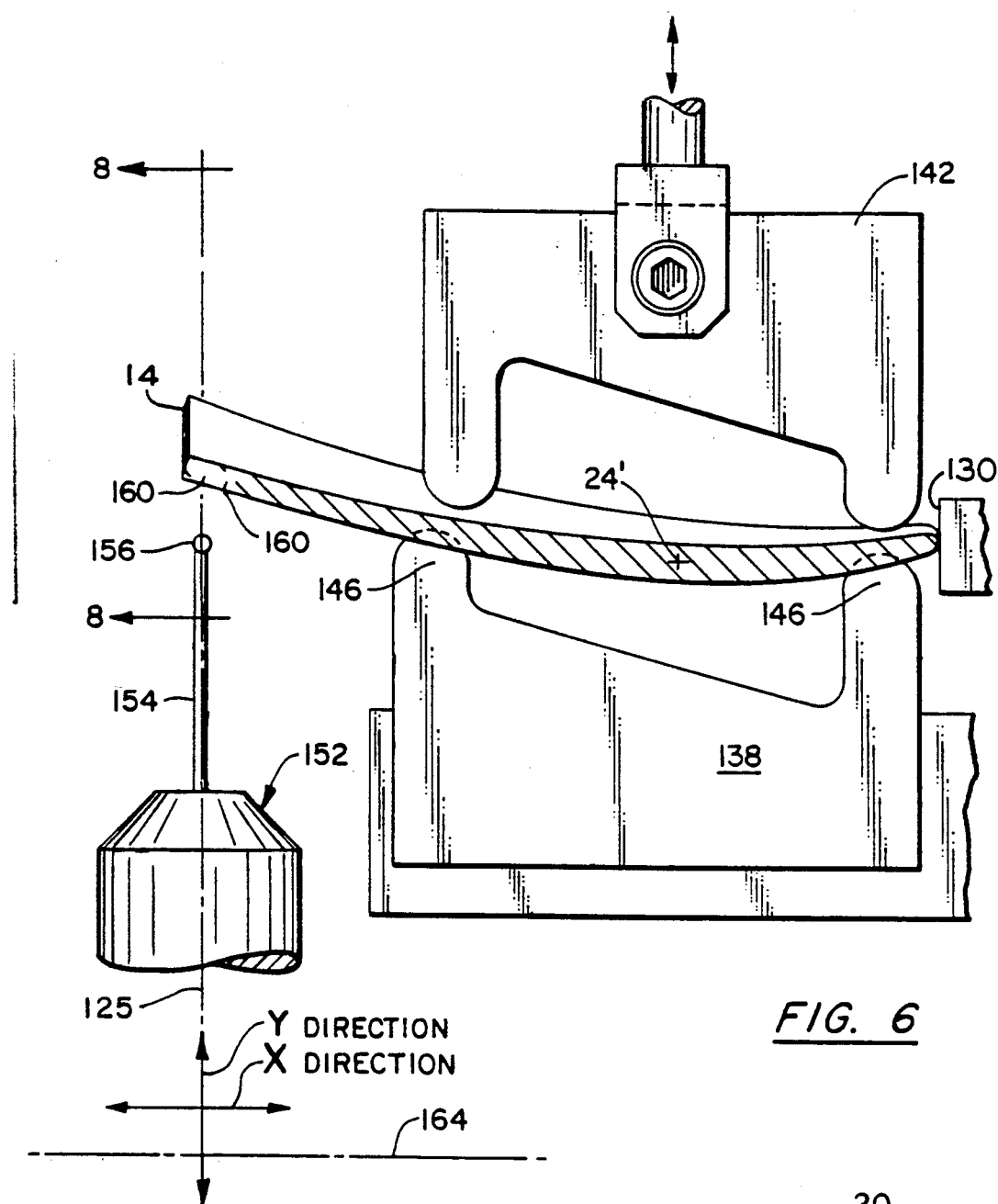
FIG. 6 is a sectional view taken along the line 6—6 of FIG. 4.

Referring, now, to FIGS. 3, 4 and 5, the workpiece holding apparatus 115 is secured to the face 118 of the plate 114. The holding apparatus 15 comprises a pair of spaced apart knife edges 128, 130 precisely located a predetermined distance from the face 118. The face 118 is a precise, known distance from the Y axis. A locating member 132 includes a locating surface 134 at a known distance from the C axis. Also secured to the plate 114 are lateral locators 136, 138 that, in conjunction with the knife edges 128, 130, locate the airfoil such that its stacking line 24 is parallel to a known distance from the Y axis. The locator 138 is best shown in FIG. 6.

The airfoil 10 is positioned into the workpiece holding apparatus by urging the leading edge 12 against the knife edges 128, 130, and positioning the outer edge 140 of the end tab 122 on the locating surface 134. The surface 134 locates the airfoil in the Y direction. Lower hydraulically operated rocker arm 142 urges the lower portion of the suction surface of the airfoil against the locating feet 146 of the lateral locator 138. Similarly, a hydraulically actuated plunger 144 urges the upper portion of the suction surface of the airfoil against the locating feet of the upper lateral locater 136.

After the airfoil is secured in its appropriate position by the locating means just described, four additional sets of hydraulically actuated plungers 148 are moved into position against opposites sides of the central portion of the airfoil to provide additional support for the workpiece. Hydraulic lines are designated by the reference numeral 150 throughout the figures.

Figure 9:
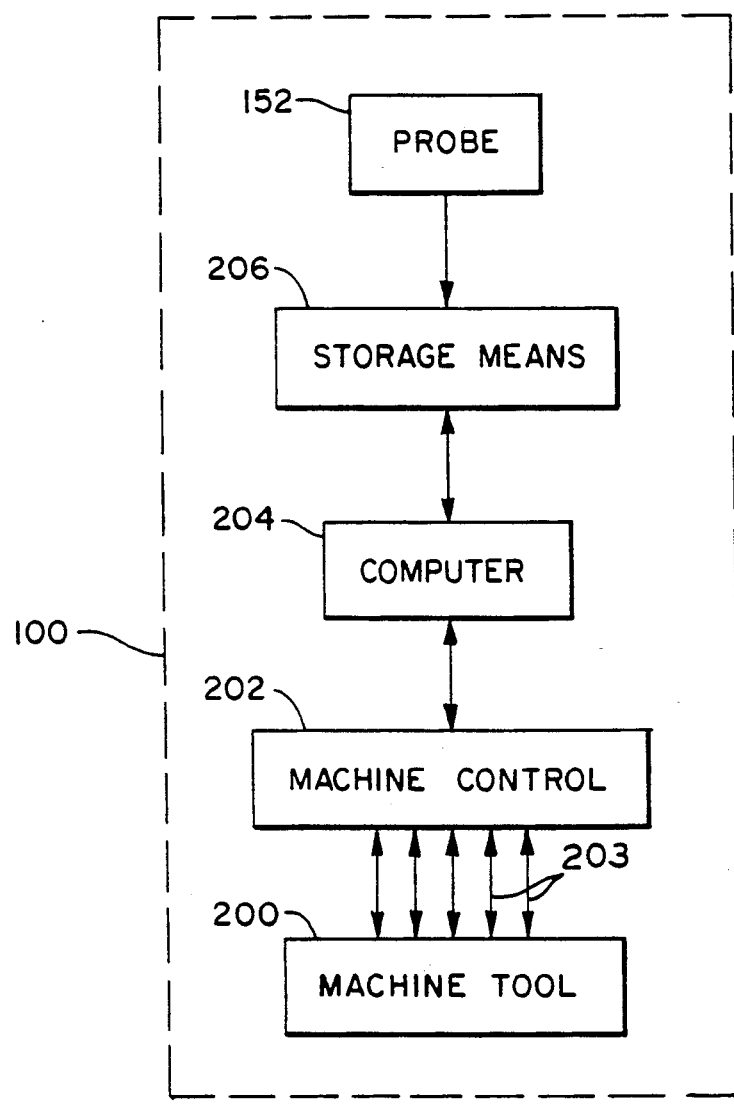
FIG. 9 is a block diagram illustrating the interrelationship between various portions of the machining system of the present invention.

With reference to FIG. 9, the machining system 100 is depicted schematically as encompassing the machining hardware described above as well as the electronic hardware which controls the operation of the machining hardware. The box 200 represents the machining hardware and is labeled "machine tool". A machine control 202 sends a variety of signals 203 to the machine tool 200 to move and rotate the hardware in a particular manner. The system 100 also includes a computer 204, storage means 206, and the probe 152. For discussion purposes, the computer and storage means are shown as separate from the machine control; however, they may also be considered part of the machine control.

The storage means 206 is simply a memory which is accessible by the computer 204. In the method of the present invention a computer program, which is also referred to herein as the machine program, is input into the storage means 206. The machine program includes certain preselected nominal engineering design dimensions of the part to be machined. Also in the storage means is data relating to the machine tool zero or home position. Further, each time the probe 152 touches a point on the workpiece (e.g., airfoil 10) or on the gauge block 116, data indicative of the machine tool position at that instant is placed in the storage means.

During operation the computer accesses the machine program and selected data in the storage means, performs certain calculations on the stored data, and either sends newly calculated data to the storage means for later use or sends instructions to the machine control 202 which operates the machine tool 200 according to those instructions.

Prior to actual machining of the airfoil the machine program instructs the machine tool 200 to move the probe and fixture such that the probe contacts the gauge block 116 on several surfaces, such as the surfaces a, b, c and d. (FIG. 3 shows the probe 152, in phantom, about to contact the gauge block.)

The data put into the storage means 206 as a result of those probe contacts is accessed and used by the computer 204 to calculate the length of the probe, the size of the styles tip 156, and deviations of the position and orientation of the machine tool components from the "home" position. These deviations or "machine offsets" are stored in the storage means 206 for use in the subsequent step of airfoil measurement and analysis.

In this embodiment, the airfoil 10 is defined on engineering drawings by a series of airfoil sections which are plane sections through the airfoil perpendicular to the stacking line 24 at specified locations along the length of the airfoil. The phantom line in FIG. 2 shows one such section. The distance between the stacking point 24 and the center point 28' of the trailing edge is a given nominal dimension D' for each of the several sections used to define the airfoil. The dimensions D' for these airfoil sections are input into the storage means 206 (FIG. 9) and are the nominal engineering design dimensions referred to above.

After determining the machine offsets, the airfoil surface adjacent to the unmachined trailing edge is probed (per instructions from the machine program) at locations corresponding to the engineering drawing sections which define the airfoil. In FIG. 4, each of these sections are represented by a pair of horizontally spaced apart cross marks 160 which are superimposed upon the drawing for purposes of illustration. Each pair of point 160 lies in a plane perpendicular to the stacking line 24. There are seventeen such pairs of points 160 for the airfoil in this example, which represent the seventeen airfoil sections used to define the engineered design of the finished airfoil. For the particular airfoil of this example, which is about 17 inches long and 5 inches wide, the points 160 closest to the unmachined trailing edge are approximately 1/10 inch in from that edge; and each pair of points 160 are about 1/10 of an inch apart. These distances are somewhat exaggerated in the drawing for clarity. The probe is also programmed to touch a point 162 located 1/10 inch above (i.e., in the Y direction) each of the points 160 closest to the unmachined trailing edge (see FIG. 8). (The points 162 could equally as well be below the points 160. The machine program is written according to where the programmer desires to have the probe contact the part.) Thus, for each airfoil section, three points are probed (one is actually above the section plane). As the probe touches each point, the position of that point, with appropriate machine offsets applied, is stored in the storage means 206.

According to the method of the present invention, the probe is programmed to touch (in some preselected efficient order) all the points 160, 162 along the length of the trailing edge, thereby placing into the storage means 206 data for the position of every one of those points. Note that the order of contacting the points is not critical, except the machine program must be written to access the correct point information when doing its calculations.

In this example, there is no rotation of the airfoil during probing. The fixture moves only in the X direction to allow the probe to contact each of the pair of points 160 at each section. The probe itself moves only parallel to the Y axis as it moves from section to section and between 160, 162 at each location No rotation of the airfoil 10 is necessary since the airfoil does not have a large amount of curvature at its trailing edge.

Some airfoils may have very large amounts of twist about their stacking line resulting in a highly curved trailing edge. For airfoils such as that, it would be required that the airfoil be rotated about the stacking line at each new airfoil section being probed so that the surface of the airfoil near the trailing edge was always approximately perpendicular to the spindle axis 125. In some cases, it might also be necessary or desirable to use the probe to determine the location of the unmachined edge at each section. This would be particularly important for airfoils having significant variations in width (i.e., chordlength) along their longitudinal extent. Once the unmachined edge is located, the probe could then move, relative to the airfoil, a predetermined distance inwardly from the edge so that it is probing the airfoil surface at the same distance inward from the uncut edge at every section along the length of the airfoil, despite the variations in airfoil width at each section.

Figure 7:
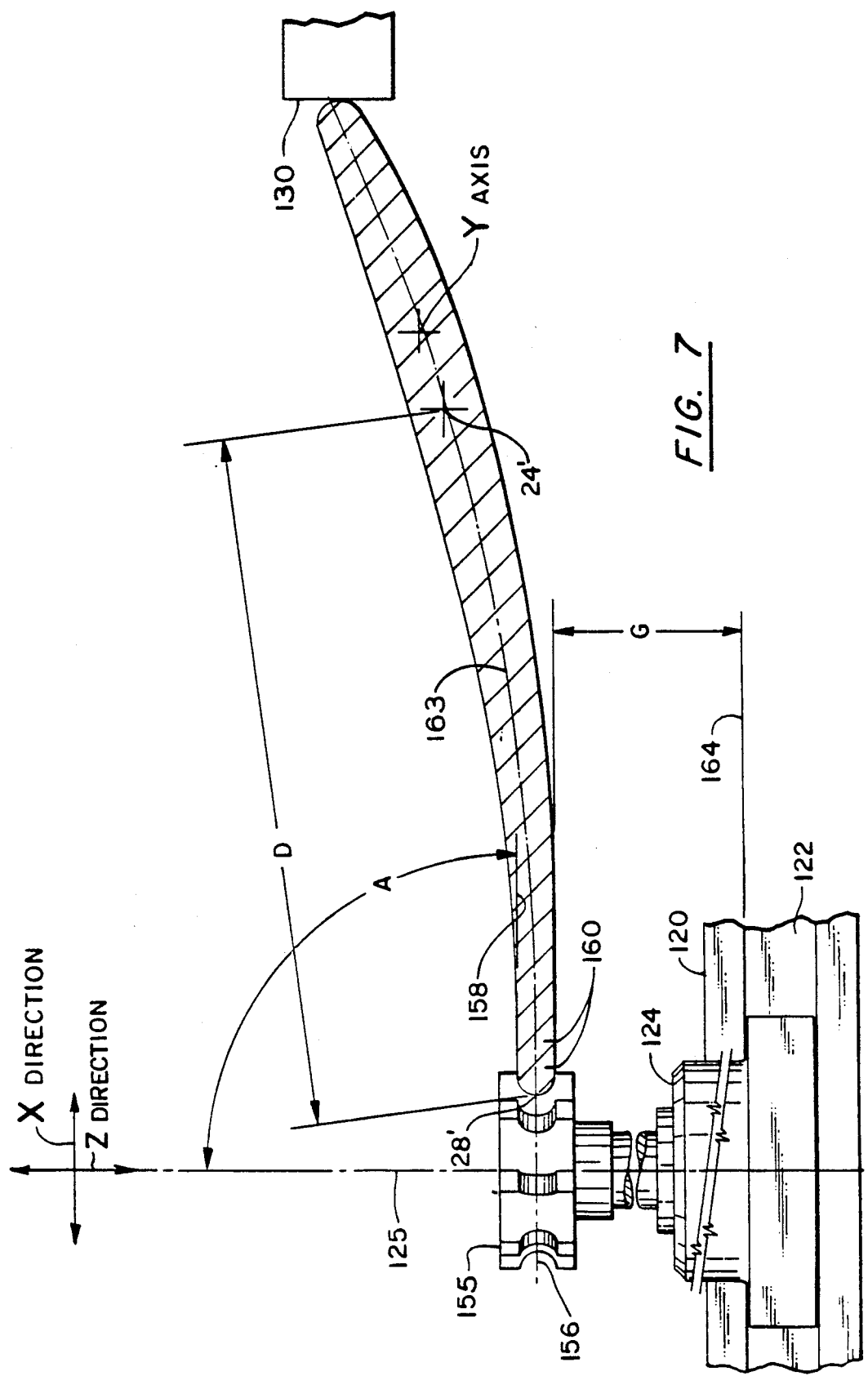
FIG. 7 is a sectional view taken at the same vertical location as the view of FIG. 6, but with the probe replaced by the cutter and the apparatus reoriented to the appropriate cutting position for the section of airfoil shown, in accordance with the teaching of the present invention.

Returning to the present example, after the airfoil has been probed, the probe 152 is removed from the spindle 124 (such as by a robot arm or by hand) and is replaced by a cutting tool or cutter which rotates about the spindle axis 125. FIG. 7 shows a full-form cutter 154 in position in the spindle 124 and in the process of cutting the workpiece at the section shown. The cutter teeth form circular arcs which are bisected by the plane 156 which is perpendicular to the spindle axis. In this example, the pressure and suction surfaces of the airfoil 10 are parallel as the surfaces approach the trailing edge. In order for the cutter 155 to properly cut a radius into the trailing edge at each point along the length of the trailing edge, the axis 125 of the cutter must be perpendicular to the airfoil surfaces adjacent to the trailing edge in the plane of the section being cut at that instant. Thus, if the lead line 158 is tangent to the airfoil pressure surface adjacent to the trailing edge in the plane of the airfoil section containing the spindle or cutter axis, the proper machining of the airfoil of this example requires that the angle A be 90° (or very close to it) at all times. Similarly, a line bisecting the trailing edge surfaces must be perpendicular to and intersect the spindle axis and also lie in the plane 156. In a more generic sense, a tangent to the airfoil section mean chordline 163 at the trailing edge should be perpendicular to the axis 125 and in the plane 156.

Accomplishing the foregoing with the airfoil 10, which has a curved trailing edge, requires that, as the cutter 154 moves in the Y direction, the airfoil be continuously reoriented relative to the cutter to maintain the appropriate angular orientation between the cutter and the trailing edge. Simultaneously, the airfoil must be moved in the X direction, such that the distance D at each airfoil section is maintained to the nominal engineering dimension D' (FIG. 2). It is apparent that the information provided by the probe to the storage means 206 relating to the position of each pair of points 160 can be used to calculate how much the airfoil must be rotated about the Y axis in order to orient the line connecting the points 160 on the airfoil surface perpendicular to the spindle axis.

Figure 8:
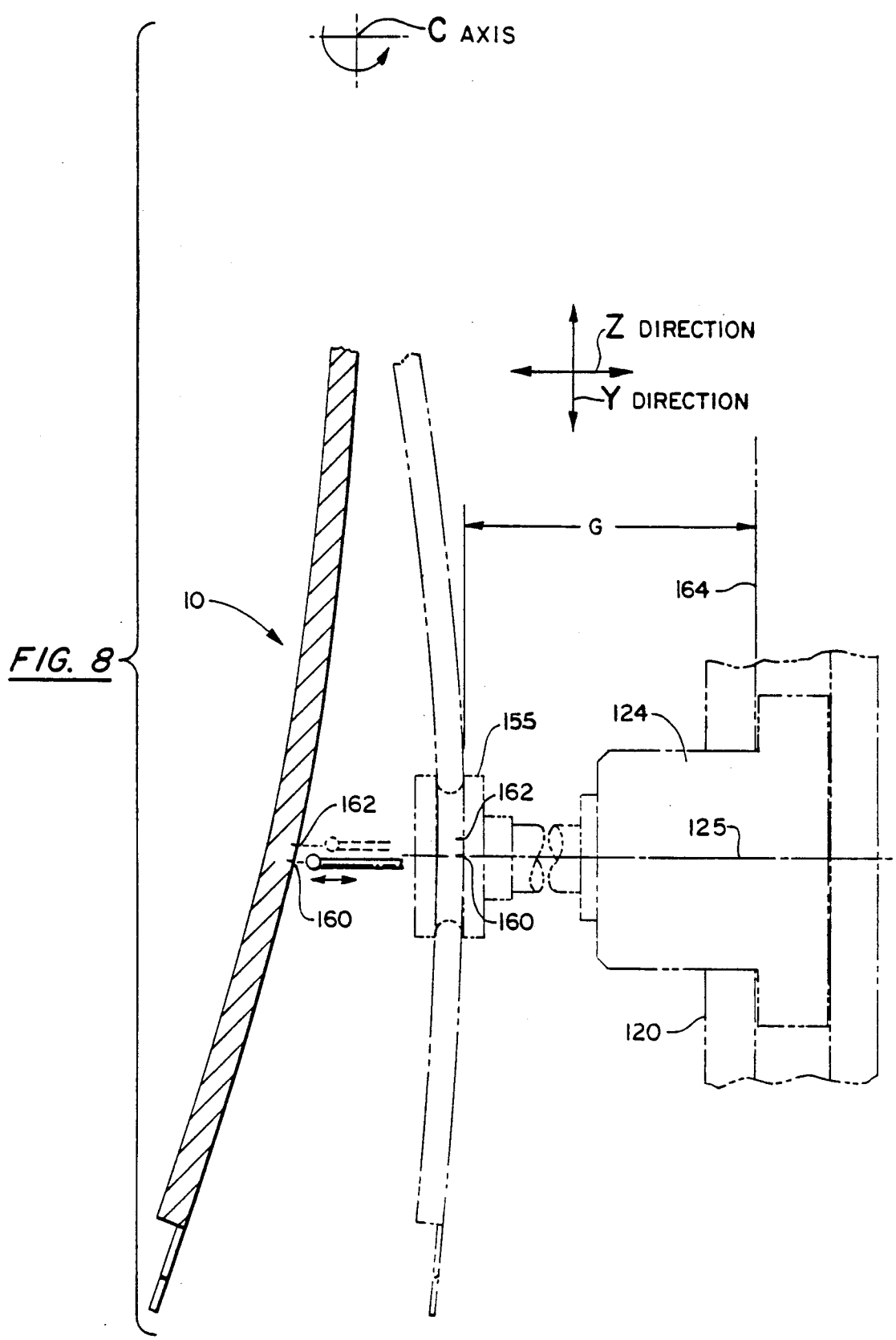
FIG. 8 is a sectional view taken along the line 8—8 of FIG. 6 showing the probe about to contact the airfoil surface. Shown in phantom is the cutter in operative position in place of the probe, with the same airfoil section having been appropriately reoriented relative to the cutter in accordance with the teaching of the present invention.

The phantom lines in FIG. 8 show the cutter 155 in operation when the spindle axis 125 is aligned with the point 160 adjacent the edge 14 (FIG. 6). The machine program has accessed the data concerning the probed points 160, 162 and caused the airfoil to be rotated (from its probed position shown in full) an appropriate amount about the C axis, such that the line connecting the point 160, 162 on the surface of the airfoil is perpendicular to the spindle axis. The machine program also adjusts the location of the spindle in the Y direction to compensate for the change in the Y coordinate of the point 160 as a result of the rotation of the airfoil about the C axis.

In FIG. 7 and 8, during cutting, the points 160, 162 are a known distance G from a reference plane 164 which is perpendicular to the spindle axis. The nominal thickness of the trailing edge in this example happens to be constant along the length of the airfoil. This nominal thickness dimension was previously input into storage means 206. When cutting, the computer continuously positions the cutter such that its bisecting plane 156 is a distance from the reference plane 164 which is equivalent to the dimension G plus onehalf the nominal thickness of the trailing edge.

The computer program also accesses the dimension D' for the particular section being cut at the moment such that the machine control 202 sets the appropriate distance between the spindle axis and the stacking point 24 to result in the dimension D being equal to D' at that section. The machine program automatically compensates for Z and X direction movement of the points 160 resulting from rotations about the Y axis which were required to orient the line connecting the pair of points 160 perpendicular to the spindle axis.

As set forth above, nominal engineering dimensions for the finished airfoil is input into and stored in the storage means 206 only for the seventeen airfoil sections corresponding to the location of the pairs of points 160 shown in FIG. 4. And the cutting tool 155 is positioned correctly at those sections based upon calculations made by the computer 204 utilizing the stored machine offsets, engineering dimensions and probe generated data for those sections. The cutting tool is programmed to travel along the airfoil trailing edge at a constant rate of speed in Y direction. Thus it takes the cutting tool a known length of time to move from one airfoil section to the next. When it reaches the next section it and the airfoil are positioned correctly for the cut at that section. The machine program causes all the linear movements of the airfoil and cutting tool in the X, Y and Z directions, and the rotations, if any, of the airfoil about the C and Y axis to be at appropriate constant rates of speed between adjacent airfoil sections, such that the cutting tool and airfoil simultaneously arrive at the next section appropriately positioned. By that technique the cutting of the trailing edge smoothly transitions from one section to the next.

In this example, the cutter 154 is a full-form cutter. In the machining of certain parts, it may be preferable or necessary to use a half-form cutter; however, that would require each of two cutters to make a pass along the length of the airfoil trailing edge, each cutter forming half the trailing edge shape. Half-form cutters may be particularly useful when, for example, the trailing edge is highly curved, or when the thickness of the trailing edge is variable either by design or due to significant manufacturing tolerances which cannot be ignored. In the case of a variable thickness edge, it may be required to probe points on both the pressure and suction surface of the airfoil. The machine program would be designed to use that information to calculate a point equidistant from both surfaces at each section, and thereby determine the center point of the trailing edge (e.g., corresponding to point 28' in FIG. 7), so as to enable the machine control to correctly position the cutter as it moves along the edge.

Although in this example a five axis machining system is described, it should be apparent that some parts may be machined using only a three or four axis machining center. For example, if the unmachined trailing edge of the airfoil 10 of the example described above were straight and parallel to the stacking line within certain acceptable tolerances then there would be no need to make the angular adjustment about the C axis as shown and described with respect to FIG. 8. Therefore, a machining system without the capability of rotating about an axis corresponding to the C axis could be used. Similarly, for certain airfoil designs, it might also be unnecessary to rotate the airfoil about its stacking line during the cutting operation.

Although this exemplary embodiment was directed to the machining of the trailing edge of an airfoil, it is equally as applicable to the machining of the leading edge of an airfoil, the edge of a rotor blade platform, or even the outermost tip of an airfoil, such as the tip of a compressor or turbine rotor blade. Actually, the method is readily adaptable and useful for machining any elongated feature of a part, the location and orientation of which cannot be accurately predicted when the part is fixtured for the machining operation. If many of such parts are to be made in a production operation, the present method of manufacture accommodates these part to part variations and allows automated machining using a single computer program for the entire production run of that particular part. It should also be noted that the step of determining machine offsets by probing a gauge block need not be done prior to cutting each new piece. Only an occasional resetting of the offsets is likely to be required.

Although this invention has been shown and described with respect to detailed embodiments thereof, it will be understood by those skilled in the art that various changes in form and detail thereof may be made without departing from the spirit and scope of the claimed invention.

We claim:

1. A method for machining an elongated edge of a workpiece utilizing a numerically controlled machining system, comprising the steps of:
    (a) positioning the workpiece in fixture means of the system;
    (b) positioning a probe in a holder which is part of the system and moveable relative to the fixture means;
    (c) moving, under the direction of a machine program, the holder and fixture means relative to each other to cause the probe to contact a plurality of points on the workpiece along the length of and adjacent to the edge to be machined, and generating by such contacts data indicative of the position of such contacted points relative to the fixture means;
    (d) storing in a memory of the system such contacted point position data;
    (e) storing in the memory of the system preselected data indicative of desired after machining dimensions of the workpiece;
    (f) removing the probe from and positioning a cutting tool in the holder; and
    (g) machining the elongated edge of the workpiece under the direction of a machine program which accesses the stored data and causes the cutting tool to follow the elongated edge of the workpiece, cutting the edge to preselected dimensions as the tool travels relative thereto, the fixture means and holder being reoriented relative to each other as the tool moves along the edge to maintain the tool in appropriate angular and positioned relation to the workpiece over the length of the edge.

2. A method for machining a leading or trailing edge of an airfoil workpiece using a numerically controlled machining system, the workpiece having an airfoil stacking line, said system comprising:
    (a) machining apparatus including a work table, fixture means for holding an airfoil workpiece, said fixture means being secured to said work table, spindle means for holding, alternately, a cutting tool and a probe, said spindle means having a spindle axis, and being moveable relative to said fixture means;
(b) programmable machine control means adapted to control relative movement between the fixture means and spindle means and including data storage means and computer means;
said method comprising the steps of:
(1) fixing an airfoil workpiece within the fixture means such that the location and orientation of the stacking line of the workpiece relative to the fixture means is known within predetermined tolerances, and the location, relative to the fixture means, of at least one point on the workpiece not on the stacking line is known within predetermined tolerances;
(2) entering into the data storage means desired engineering design dimensions to which the workpiece is to be machined;
(3) placing the probe in the tool holding means and probing therewith one or more preselected points on the surface of the airfoil workpiece at or near each of a preselected number of spaced apart locations along the length of the workpiece, adjacent the workpiece edge to be machined, the step of probing causing data to be stored in the data storage means indicative of the actual position of each point probed relative to the fixture means;
(4) removing the probe from the spindle means and replacing it with the cutting tool which rotates about the spindle axis;
(5) machining the edge of the airfoil workpiece by machine control under the direction of a computer program which accesses the data in said storage means, and uses that data to generate instructions to the machine control which, in turn causes the cutting tool to be brought into position at an initial one of said probed locations along the airfoil workpiece edge and to accurately follow along that edge, cutting the edge to a desired shape as it travels relative thereto, the workpiece and the cutting tool being reoriented relative to each other as the cutting tool moves along the edge to maintain the spindle axis in appropriate angular and positional relation to the workpiece over the length of the edge.

* * * * *